(12) United States Patent
Arai et al.

(10) Patent No.: US 6,807,045 B2
(45) Date of Patent: Oct. 19, 2004

(54) THIN SURFACE MOUNTED TYPE SOLID ELECTROLYTIC CAPACITOR

(75) Inventors: Satoshi Arai, Sendai (JP); Takayuki Inoi, Sendai (JP); Yoshihiko Saiki, Sendai (JP); Sadamu Toita, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/622,908

(22) Filed: Jul. 17, 2003

(65) Prior Publication Data
US 2004/0017645 A1 Jan. 29, 2004

(30) Foreign Application Priority Data
Jul. 18, 2002 (JP) .......................... 2002-208998

(51) Int. Cl.⁷ .................................................. H01G 4/35
(52) U.S. Cl. .................. 361/302; 361/301.3; 361/303; 361/306.1; 361/321.1
(58) Field of Search ............................. 361/302, 301.1, 361/321.1, 321.4, 321.5, 303, 305, 306.1, 306.3, 308.1, 311, 313, 523, 528

(56) References Cited
U.S. PATENT DOCUMENTS 5,894,402 A * 4/1999 Strange et al. ............... 361/514
6,134,099 A * 10/2000 Igaki et al. .................. 361/509
6,208,501 B1 * 3/2001 Ingalls et al. ................ 361/303
6,292,348 B1 * 9/2001 Lin ........................... 361/301.3
6,678,927 B1 * 1/2004 Retseptor ................... 29/25.42

FOREIGN PATENT DOCUMENTS

| JP | 59-219923 A | 12/1984 |
|---|---|---|
| JP | 05-275290 A | 10/1993 |
| JP | 09-180962 A | 7/1997 |

\* cited by examiner

Primary Examiner—Dean A. Reichard
Assistant Examiner—Nguyen T. Ha
(74) Attorney, Agent, or Firm—Frishauf, Holtz, Goodman & Chick, P. C.

(57) ABSTRACT

An external cathode terminal (16) is adhered to one surface of a capacitor element while a prepreg (25) is adhered to another surface of the capacitor element. A reinforcement plate (26) is adhered to the prepreg. Heat and pressure are applied to the external cathode terminal, the prepreg, and the reinforcement plate to elute thermosetting resin from the prepreg in the side of the capacitor element, thereby sealing the side of the capacitor element with eluted material (27A, 27B). Inasmuch as transfer molding is not used as exterior package, the element never deforms by injection pressure of resin. It is possible to thin by a thickness of exterior package resin. Inasmuch as eluted thermosetting resin does not include a mold release agent, it has good adhesion for the external cathode terminal.

15 Claims, 8 Drawing Sheets

THIN SURFACE MOUNTED TYPE SOLID ELECTROLYTIC CAPACITOR

This application claims priority to prior application JP 2002-208998, the disclosure of which is incorporated herein by reference.

BACKGROUND OF THE INVENTION

This invention relates to a solid electrolytic capacitor and a method of fabricating it and, in particular, to technique of sealing and wrapping of the solid electrolytic capacitor using a flat-shaped capacitor element.

Surface mounted type solid electrolytic capacitors are well known in the art. For example, the surface mounted type solid electrolytic capacitor comprises an anode electrode made of valve-action metal such as tantalum, aluminum or the like, a dielectric obtained by oxidizing the valve-action metal serving as a base material of the anode electrode, a conductive layer made of manganese dioxide, a conductive macromolecule or the like firmly formed on the dielectric, and a cathode electrode obtained by laminating a graphite layer or a silver pasted layer on the conductive layer. In such surface mounted type solid electrolytic capacitors, ones each comprising a capacitor element having a configuration of pillar body such as a column or a square pole are well known in the art. As the others, capacitors each using a flat shaped element are disclosed, for example, in Japanese Unexamined Patent Publication Tokkai No. Hei 5-275,290 or JP-A 5-275290. This invention relates to a surface mounted type solid electrolytic capacitor using such flat capacitor element.

Speaking characteristics of conventional surface mounted type solid electrolytic capacitors described above from the point of view of relevance of this invention, any capacitor is covered with an exterior finishing resin body formed by molding the surrounding whole of an element by thermosetting resin.

With this structure, it is difficult to thin thickness of the whole of the capacitor including the exterior finishing resin. In addition, sealing of the exterior finishing resin is not always sufficient.

SUMMARY OF THE INVENTION

It is therefore an object of the present invention to provide a surface mounted type solid electrolytic capacitor using a flat solid electrolytic capacitor element which is capable of thinning a thickness of the whole of the capacitor.

It is another object of the present invention to provide a surface mounted type solid electrolytic capacitor using a flat solid electrolytic capacitor element which is capable of improving sealing of the capacitor.

Other objects of this invention will become clear as the description proceeds.

On describing the gist of an aspect of this invention, it is possible to be understood that a solid electrolytic capacitor comprises a flat solid electrolytic capacitor element having first and second surfaces opposite to each other and a plate-shaped external cathode terminal disposed on the first surface of the flat solid electrolytic capacitor. According to the aspect of this invention, the above-mentioned solid electrolytic capacitor further comprises a double-sided thermal adhesive film impregnated with thermosetting resin put on the second surface of the flat solid electrolytic capacitor and a reinforcement plate fastened on the double-sided thermal adhesive film impregnated with thermosetting resin. The flat solid electrolytic capacitor is sandwiched between the plate-shaped e external cathode terminal and the double-sided thermal adhesive film impregnated with thermosetting resin, the reinforcement plate. The flat solid electrolytic capacitor has side faces sealed with an eluted material of thermosetting resin impregnated in the double-sided thermal adhesive film impregnated with thermosetting resin.

DESCRIPTION OF THE PREFERRED EMBODIMENT

Figure 1:
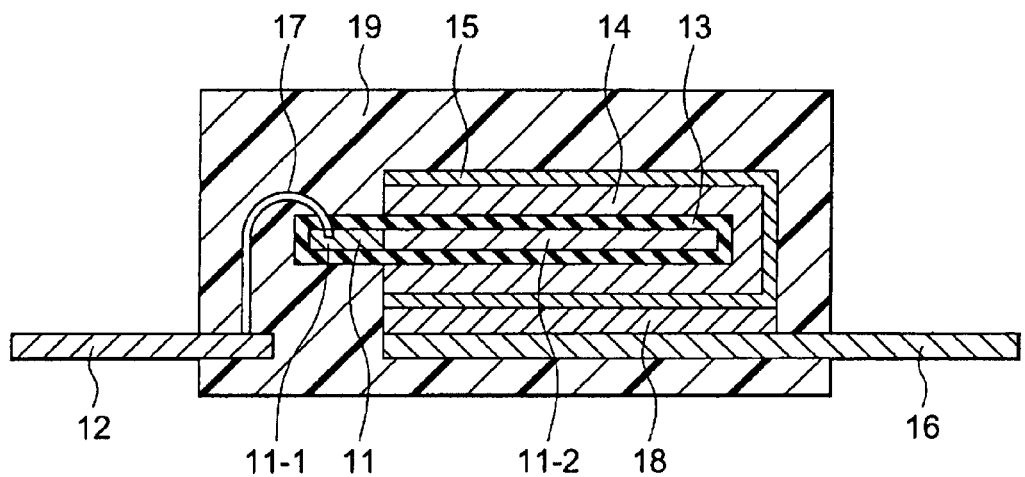
FIG. 1 is a cross sectional view of a first conventional solid electrolytic capacitor.

Referring to FIG. 1, a first conventional solid electrolytic capacitor will be described at first in order to facilitate an understanding of the present invention. FIG. 1 is a cross sectional view of the first conventional solid electrolytic capacitor which is similar to that illustrated in FIG. 1 of the above-mentioned JP-A 5-275290.

The illustrated solid electrolytic capacitor comprises an aluminum foil 11 having an extended surface by etching. The aluminum foil 11 may be therefore called an etched aluminum foil. The aluminum foil 11 is divided into first and second regions 11-1 and 11-2 which are located at left-hand and right-hand sides on a paper of FIG. 1. The first region 11-1 of the aluminum foil 11 is for connecting to an external anode terminal 12. The second region 11-2 of the aluminum foil 11 occupies the greater part of the aluminum foil 11 and is called a capacitance manifestation region. On the capacitance manifestation region 11-2 of the aluminum foil 11, an aluminum oxide film 13 is formed. The aluminum oxide film 13 is obtained by anode oxidizing the aluminum foil 11 serving as a base material. On the aluminum oxide film 13, a semiconductor layer 14 is firmly formed. On the semiconductor layer 14, a conductive layer 15 is firmly formed.

The semiconductor layer 14 is made of solid electrolyte. In the example being illustrated, the solid electrolyte comprises lead dioxide and lead sulfate. In the manner which is well known in the art, manganese dioxide, TCNQ, or a conductive macromolecule or the like is well used as the solid electrolyte. Specifically, inasmuch as the conductive macromolecule has a high conductivity and a low equivalent series resistance (ESR) as a capacitor, the conductive macromolecule is frequently used in recent years. The conductive layer 15 normally has a structure where a graphite layer and a silver past layer are laminated in this order.

A combination of the above-mentioned aluminum foil 11, the aluminum oxide film 13, the semiconductor layer 14, and the conductive layer 15 constitute a fundamental structure (a solid electrolytic capacitor element) as the capacitor. Specifically, the aluminum foil 11 serves as an anode electrode, the aluminum oxide film 13 serves as a dielectric, and a combination of the semiconductor layer 14 and the conductive layer 15 serves as a cathode electrode. In addition, the external anode terminal 12 and an external cathode terminal 16 are mounted to the capacitor element in order to electrically connect to the exterior. An exterior package is applied for sealing of the solid electrolytic capacitor element and for forming of an external form of the capacitor.

The external anode terminal 12 is made of a solderable metal plate such as a lead frame made of 42 alloy. The external anode terminal 12 is connected to the external anode terminal connecting region 11-1 of the above-mentioned aluminum foil 11 through a conductive thin wire 17 such as an aluminum wire. On the other hands, the external cathode terminal 16 is made of the lead frame made of a metal material similar to the external anode terminal 12. The external cathode terminal 16 is conductively fixed to the conductive layer 15, which is a most outer layer of the cathode electrode of the capacitor element, by a conductive adhesive agent such as a silver paste 18.

The capacitor element, the external anode terminal 12, the external cathode terminal 16, and the aluminum wire 17 are covered with exterior package epoxy resin 19 with a part of tip side (side apart from the capacitor element) in the external anode terminal 12 and the external cathode terminal 16 left. The exterior package epoxy resin 19 is normally formed by a transfer molding of thermosetting resin such as epoxy resin.

Figure 2:
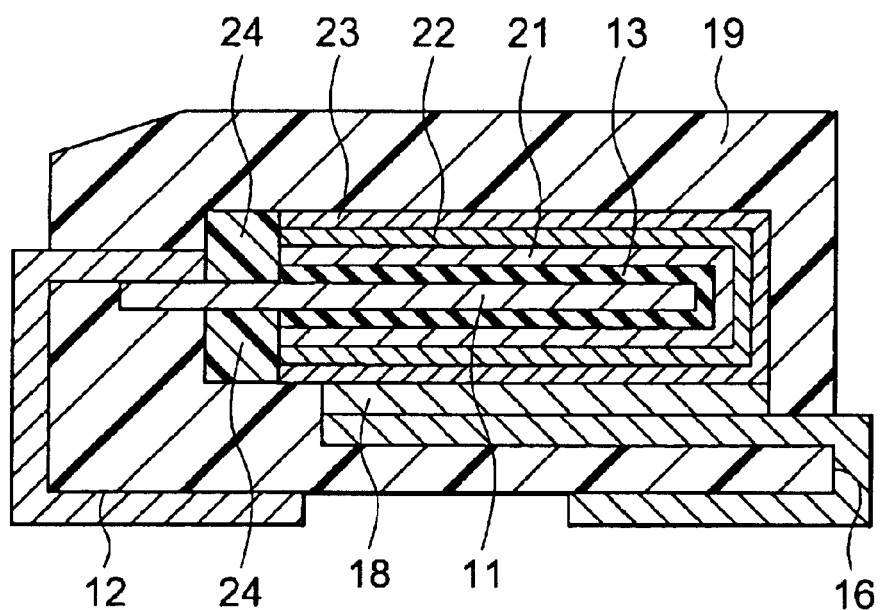
FIG. 2 is a cross sectional view of a second conventional solid electrolytic capacitor.

Other solid electrolytic capacitors using frat elements are known in the art. By way of examples, the external anode terminal 12 may be directly fixed and connected to the aluminum foil 11 serving as the anode electrode by welding or the like, as mentioned in the above-mentioned JP-A 5-275290. In order to make a mounting area small on mounting on a mounting substrate such as a printed circuit substrate, the solid electrolytic capacitor may have a terminal structure where the external anode terminal 12 and the external cathode terminal 16 are bent along side walls of the exterior package epoxy resin 19 and bent to a lower side of the capacitor element, as illustrated in FIG. 2. In FIG. 2, a reference symbol of 21 indicates a poly-pyrrole layer, a reference symbol of 22 indicates a graphite layer, a reference symbol of 23 indicates a silver paste layer, and a reference symbol of 24 indicates an epoxy resin body (a masking material).

Speaking from a point of view of relevance to this invention about a characteristic of the above-mentioned several conventional surface mounted type solid electrolytic capacitors, any capacitor is covered with the exterior package epoxy resin 19 formed by molding the whole surrounding of the solid electrolytic capacitor element with the thermosetting resin.

In the above-mentioned surface mounted type solid electrolytic capacitors, to make a solid electrolytic capacitor element flat results in making whole of the capacitor thin. However, inasmuch as structure and a manufacturing method where whole of the flat solid electrolytic capacitor element is covered with the exterior package epoxy resin 19 by molding of the thermosetting resin is used, points to be improved are left as follows.

Firstly, it is impossible to thin a thickness of whole of the capacitor including the exterior package epoxy resin 19 and a merit of capable of thinning by making an element flat results in decreasing. More specifically, on transfer molding, a capacitor element is inserted in a molding die and molten thermosetting resin is forced in a space between the die and the capacitor element. The capacitor element is an element where the external anode terminal 12 and the external cathode terminal 16 are mounted thereto and the aluminum wire 17 for connecting the external anode terminal 12 and the aluminum foil 11 is bonded. In this event, so that the forced molten resin closely flows in the die, a gap having less resistance for flowing of the molten resin is required between the capacitor element and the die. Accordingly, a thickness of the exterior package epoxy resin 19 must have a limit or more and it is impossible to thin whole of the capacitor until the limit or less.

It is assumed that the gap between the die and the capacitor element becomes small in order to thin the thickness of the exterior package epoxy resin 19. Under the circumstances, trouble where the element is exposed from the exterior package epoxy resin 19 easily occurs because of a little difference of size of the element or slope of the element in the die. In addition, inasmuch as injection pressure of the molten resin must be high by a part where the gap becomes small, trouble where the element deforms subject to stress by the injection pressure of the resin may occur. As a result, occurrence probability of the trouble becomes excessively high by a part where the injection pressure becomes high and a rate of a quality item on manufacturing becomes low.

Secondary, sealing of the exterior package resin body 19 is not always sufficient. More specifically, the thermosetting resin such as the epoxy resin for use in molding includes a mold release agent in order to improve mold release when the capacitor is took from the die after molding. Because of this, inasmuch as adhesion is not sufficient between the exterior package resin body 19 and the lead frame material at all, oxygen, moisture or the like invade from a boundary face between the exterior package resin body 19 and the external anode terminal 12, the external cathode terminal 16. This causes serious problems specifically in the solid electrolytic capacitor which uses the conductive macromolecule as the solid electrolyte. As described above, the conductive macromolecule is frequently used in the recent years because the conductive macromolecule has high conductivity compared with those of other solid electrolytes. On the other hand, inasmuch as the conductivity of the conductive macromolecule lowers under existence of oxygen because oxidization advances, ESR of the capacitor gradually increases for a long term when the sealing is insufficient and it does not stand up to use in an extreme instance.

Figure 3A:
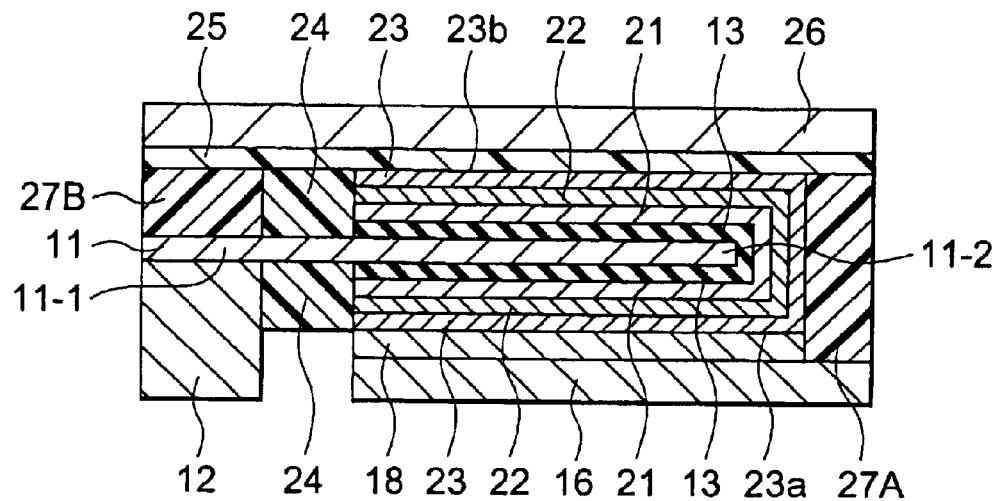
FIG. 3A is a longitudinal sectional view of an aluminum solid electrolytic capacitor according to a first embodiment of this invention.
Figure 3B:
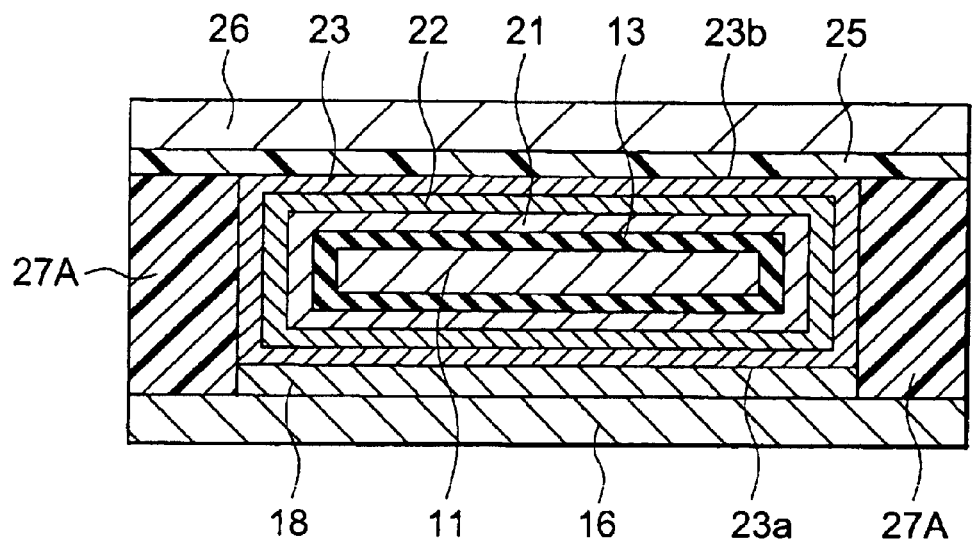
FIG. 3B is a transverse sectional view of the aluminum solid electrolytic capacitor according to the first embodiment of this invention.

Referring to FIGS. 3A and 3B, the description will proceed to an aluminum solid electrolytic capacitor according to a first embodiment of this invention. FIG. 3A is a longitudinal sectional view of the aluminum solid electrolytic capacitor. FIG. 3B is a transverse sectional view of the aluminum solid electrolytic capacitor. The illustrated solid electrolytic capacitor is similar in structure to the conventional solid electrolytic capacitor illustrated in FIG. 1 or FIG. 2 except that a method of an exterior package is different. The illustrated solid electrolytic capacitor does not use transfer molding as the exterior package at all. Different points will be mainly described.

A capacitor element is an element where an etched aluminum foil is used as an anode electrode and a conductive macromolecule is used as a solid electrolyte. The capacitor element was prepared in a conventional known manner as follows. Specifically, an aluminum foil 11 acting as the anode electrode is etched to extend a surface of the aluminum foil 11. An etching liquid may be a solution of hydrochloric acid or the like. The aluminum foil 11 is divided into first and second regions 11-1 and 11-2 which are located at left-hand and right-hand sides on a paper of FIG. 3A. The second region 11-2 of the aluminum foil 11 occupies the greater part of the aluminum foil 11 and is called a capacitance manifestation region. On the capacitance manifestation region 11-2 of the aluminum foil 11, an aluminum oxide ($Al_2O_3$) film 13 is formed by anode oxidizing the aluminum foil 11. In the anode oxidizing, a solution of ammonium salt such as adipic acid, citric acid, phosphoric acid, or the like is used as a forming liquid.

Subsequently, on the anode oxidized aluminum film 13, a conductive macromolecule layer 21 as a solid electrolyte is formed. On the conductive macromolecule layer 21, a graphite layer 22 and a silver paste layer 23 are laminated in this order. As a result, the solid electrolytic capacitor where the etched aluminum foil 11 is used as an anode electrode, the aluminum oxide film 13 is used as a dielectric, and a combination of the conductive macromolecule layer 21, the graphite layer 22, and the silver paste layer 23 is used a cathode electrode is obtained. Although a poly-pyrrole obtained by making pyrrole chemical oxidation and polymerization is used as the conductive macromolecule layer 21 in this embodiment, poly-thiophene, poly-aniline, or the like may be used as the conductive macromolecule layer 21. In addition, a forming method is not restricted to the chemical oxidation and polymerization and may be electrolytic oxidation and polymerization. In the example being illustrated, prior to forming of the conductive macromolecule layer 21, a space is formed in a portion (in this example, a left-hand side of a part where the poly-pyrrole layer 21 is formed) adjacent to the capacitance manifestation region 11-2 by a size for later mounting only an external anode terminal 12 and an insulation resin body 24 for masking is formed by preliminarily applying insulation resin such as epoxy resin and by hardening it. With this structure, it is possible to prevent a short circuit between the aluminum foil 11 serving as the anode electrode and the cathode electrode, manufacturing is easy, and a rate of a quality item is improved.

Thereafter, the external anode terminal 12 is mounted to the portion for mounting the external anode terminal of the aluminum foil 11. The external anode terminal 12 is made of a solderable material such as 42 alloy, a copper plate with solder plating, or the like. The external anode terminal 12 has a configuration of a frat plate and is jointed to the aluminum foil 11 by means of ultrasonic welding, electric resistance welding, or the like.

On an upper surface 23b (a surface opposite to a surface 23a on which the external anode terminal 12 is mounted) of the capacitor element, a double-sided thermal adhesive tape (prepreg) 25 impregnated with epoxy resin is put. On the prepreg 25, a flat reinforcement plate 26 for reinforcing a strength of the element is put. Under the circumstances, the prepreg 25 and the reinforcement plate 26 have a size so as to project from the cathode electrode of the capacitor element as shown in FIGS. 3A and 3B. In addition, the prepreg 25 and the reinforcement plate 26 extend to a mounting portion of the external anode terminal 12 of the aluminum foil 11 so as to back the mounting portion. Although the prepreg impregnated with the epoxy resin is used in this embodiment, an impregnant may be other thermosetting resins having heat resisting such as polyimide resin. Put on the prepreg 25, the reinforcement plate 26 is required to have stiffness higher than that of the prepreg 25 and the aluminum foil 11 and to never deform and bend by external force for the purpose of reinforcing the strength of the capacitor element. In the example being illustrated, the reinforcement plate 26 comprises a copper plate having a thickness of 0.1 mm.

Although the reinforcement plate 26 is put on the prepreg 25 after the prepreg 25 is put on the capacitor element in this embodiment, this invention is not restricted to this method, the prepreg 25 may be preliminarily put on the reinforcement plate 26 and the reinforcement plate 26 with the prepreg 25 may be put on the capacitor element. With this method, it is possible to adopt a method of construction comprising the steps of preliminarily cutting a large size of the reinforcement plate with the prepreg into pieces each having a size matched with a plane shape of the capacitor element and of putting each piece on the capacitor element. This method of construction is different from a method of construction comprising the steps of putting the prepreg on the capacitor element and of putting the reinforcement plate on the preimpregnation, has no difficulty of positioning between the prepreg 25 and the reinforcement plate 26 or the like, improves rate of work, and goes well.

Subsequently, one obtained by applying a conductive adhesive agent 18 such as silver paste on a flat reinforcement plate to be an external cathode terminal 16 is prepared, and this one is temporarily bonded to a lower surface 23a (a surface opposite to the prepreg put surface 23b) of the capacitor element. The external cathode terminal 16 is made of a solderable metal material which is similar to that of the external anode terminal 12.

Pressure is inflicted between the reinforcement plate 26 at the upper surface 23b side of the capacitor element and the external cathode terminal 16 at the lower surface 23a side of the capacitor element with heating. On heating and pressurization, rigid bodies (not shown) having good flatness are applied to the upper surface 23b and the lower surface 23a of the capacitor element serving as a processing subject so that the heating and the pressurization are uniformly carried out. By the heating and the pressurization, the epoxy resin impregnated in the prepreg 25 elutes and a space between portions projecting from the reinforcement plate 26 and the external cathode terminal 16 at sides of the capacitor element is filled with an eluted epoxy resin 27A. In addition, a space between the reinforcement plate 26 and a back face of the mounting portion in the external anode terminal 12 of the aluminum foil 11 is filled with an eluted epoxy resin 27B from the prepreg 25. At the same time, the silver paste (the conductive adhesive agent) 18 laid between the external cathode terminal 16 and the capacitor element hardens, the external cathode terminal 16 is fixed to the cathode electrode of the capacitor element, mounting of the external cathode terminal 16 is carried out at a same time of the exterior package, and the surface mounted type aluminum solid electrolytic capacitor according to the first embodiment of this invention is completed.

In the conventional solid electrolytic capacitors (FIGS. 1 and 2) with the exterior package of molding of epoxy resin, the thickness of the exterior package resin body 19 for the capacitor element must be 0.3–0.5 mm or more up and down by the above-mentioned reason. On the other hand, in the capacitor according to this embodiment of this invention, a thickness of the prepreg 25 and the reinforcement plate 26 is added to the capacitor element at the upper surface 23b thereof. Inasmuch as the reinforcement plate 26 is made of metal, it is possible to thin the thickness of the reinforcement plate 26 up to 0.05–0.15 mm. The prepreg 25 has the thickness of 0.3 mm. Accordingly, the thickness except for the capacitor element is 0.45 mm. It is possible to thin the thickness of whole of the capacitor.

In addition, inasmuch as the transfer molding of the thermosetting resin is not used as the exterior package in this embodiment, bad quality does not occur in principle caused by fluctuations of position relationship between the molding die and the capacitor element, errors of exterior size, bend of the capacitor element by injection pressure of the molten resin, or the like which are observed in the conventional solid electrolytic capacitors of the type.

The solid electrolytic capacitor according to this embodiment is not required to pick out of the die after processing because the solid electrolytic capacitor according to this embodiment is different from the conventional solid electrolytic capacitor where the exterior package is formed by the transfer molding of the thermosetting resin. Specifically, the solid electrolytic capacitor never occurs that adherence force between the exterior package resin body 19 and the lead frame decreases caused by side reaction for improving die releasing by including the mold release agent in the epoxy rein impregnated in the prepreg 25. To put it strongly, it is possible to heighten adherence force between the eluted epoxy resins 27A and 27B from the prepreg 25 and the external cathode terminal 16 or the aluminum foil 11 up to original adherence force between pure epoxy resin and metal material. The same is true for the epoxy resin body 24 which is put as the masking material between the external anode terminal 12 and the conductive macromolecule layer 21 at cathode side.

Figure 4:
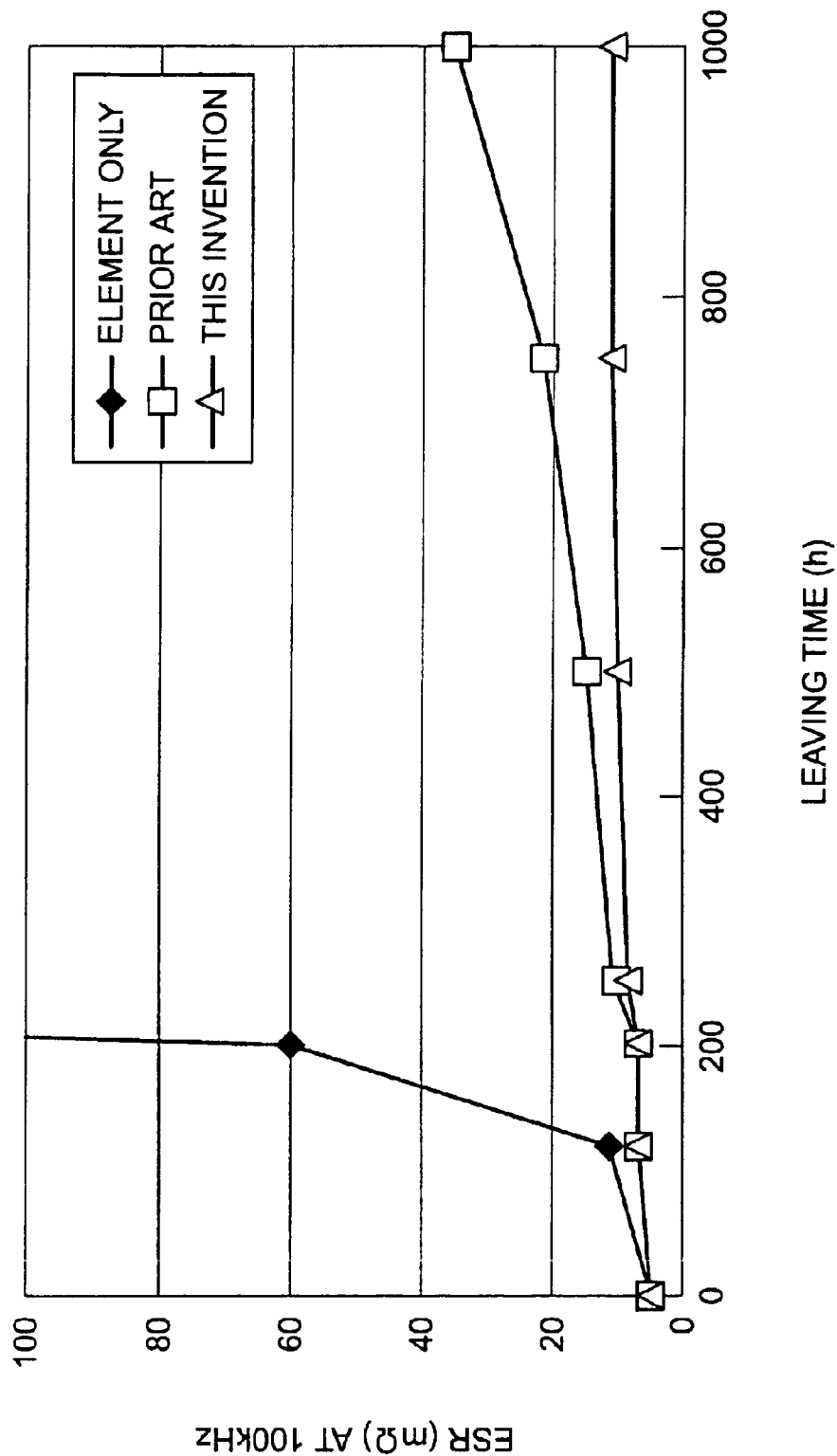
FIG. 4 is a graph showing a result of reliability test for the surface mounting type aluminum solid electrolytic capacitor according to this embodiment with results of reliability test for a capacitor element without an exterior package and for the conventional aluminum solid electrolytic capacitor with the exterior package by the transfer molding of the epoxy resin.

FIG. 4 shows a result of reliability test for the surface mounted type aluminum solid electrolytic capacitor according to this embodiment. In addition, for comparison, FIG. 4 shows results of reliability test for a capacitor element without an exterior package and for the conventional aluminum solid electrolytic capacitor with the exterior package by the transfer molding of the epoxy resin. In FIG. 4, the abscissa represents a leaving time (hours) and the ordinate represents ESR (mΩ) at a frequency of 100 kHz. The test is a high temperature leaving test which leaves a sample in an atmosphere at temperature of 150° C. and measures an electric characteristic of the sample with the progress of time. To evaluate the electric characteristic uses a value of an equivalent series resistance (ESR) at a frequency of 100 kHz.

Referring to FIG. 4, any sample has an initial value before starting of the test that is equal to about 5 mΩ. After the starting of the test, the sample of only the capacitor element without the exterior package has the ESR which rises from early time and drastically rises from a lapse of 100 hours. On the other hand, the conventional capacitor and the capacitor according to this embodiment have at first the curve up to a lapse of 200 hours. Thereafter, the conventional capacitor has the ESR which develops a tendency to rise and which separates from the curve of the capacitor according to this embodiment. After a lapse of 1000 hours, the capacitor according to this embodiment has the ESR which is about twice of the initial value while the conventional capacitor has the ESR which is equal to about 30 mΩ and which is about six times of the initial value.

The above-mentioned difference between test results is based on a difference of presence and absence of the exterior package for the capacitor elements and a difference of a method of packaging. Compared with the conventional capacitor with the exterior package by the transfer molding of the thermosetting resin, the capacitor according to this embodiment has a high ability of stopping oxygen or moisture from invading from the exterior and has good sealing. A high sealing ability in the capacitor according to this embodiment is effective in improvement of degradation with time of the ESR, improvement of stability in characteristic, high reliability, long life especially when the solid electrolyte is the conductive macromolecule having a large tendency of a lowering of conductivity under existence of oxygen or moisture.

Figure 5:
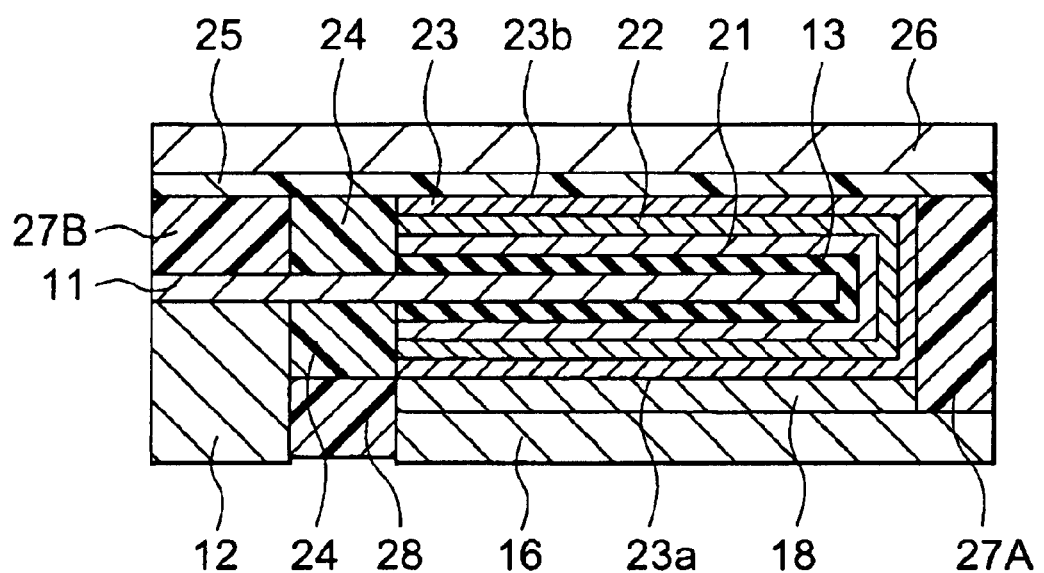
FIG. 5 is a longitudinal sectional view of an aluminum solid electrolytic capacitor according to a second embodiment of this invention.

Referring to FIG. 5, the description will proceed to an aluminum solid electrolytic capacitor according to a second embodiment of this invention. FIG. 5 is a longitudinal sectional view of the aluminum solid electrolytic capacitor. The illustrated solid electrolytic capacitor is similar in structure to the solid electrolytic capacitor illustrated in FIGS. 3A and 3B except that the solid electrolytic capacitor further comprises an additional prepreg 28.

The additional prepreg 28 is pasted on an exposed surface of the epoxy resin body 24 laid between the external anode terminal mounting portion of the aluminum foil 11 and a forming portion of the poly-pyrrole layer 21. With this structure, it is possible to heighten ability of stopping oxygen or moisture from invading from the exterior still more compared with the solid electrolytic capacitor according to the first embodiment of this invention.

Figure 6A:
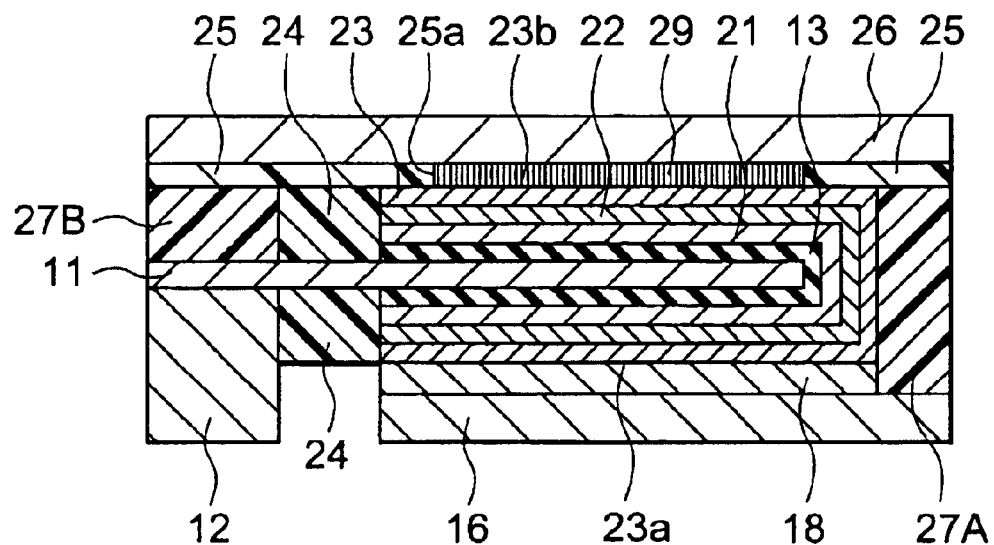
FIG. 6A is a longitudinal sectional view of an aluminum solid electrolytic capacitor according to a third embodiment of this invention.
Figure 6B:
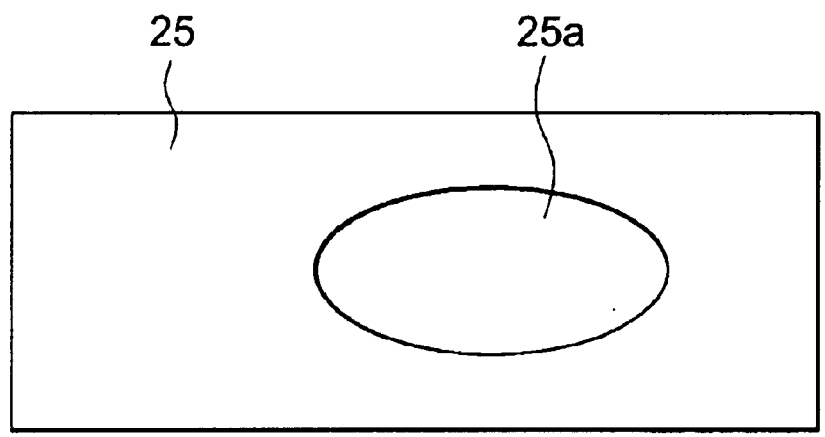
FIG. 6B is a plan view of a prepreg for use in the aluminum solid electrolytic capacitor illustrated in FIG. 6A.

Referring to FIGS. 6A and 6B, the description will proceed to an aluminum solid electrolytic capacitor according to a third embodiment of this invention. FIG. 6A is a longitudinal sectional view of the aluminum solid electrolytic capacitor. FIG. 6B is a plan view of the prepreg for use in the aluminum solid electrolytic capacitor illustrated in FIG. 6A. The illustrated solid electrolytic capacitor is similar in structure to the solid electrolytic capacitor illustrated in FIGS. 3A and 3B except that the prepreg 25 has an opening 25a in which a silver paste 29 serving as a conductive adhesive agent is filled.

The prepreg 25 has the opening 25a which passes through the front and the back. The silver paste 29 is filled in the opening 25a to conductively connect the reinforcement plate 26 with the silver paste 23 which is a most outer layer of the capacitor element. With this structure, it is possible to effectively conduct heat generated from the capacitor element to the reinforcement plate 26 by means of the silver paste 29 having heat conductivity higher than that of the prepreg and to effectively dissipate the heat.

In general, a ripple current (surge current) flows in a capacitor during operation. When the ripple current i flows in the capacitor, a temperature rise ΔT occurs in the capacitor corresponding to the equivalent series resistance r of the capacitor as follows:

$$\Delta T = (i^2 r)/b \cdot S (° C.),$$

where b represents a heat loss coefficient of the capacitor and S represents a radiating area. Although the capacitor comprising the conductive macromolecule as the solid electrolyte is a capacitor characterized by a less equivalent series resistance, a low impedance, and a good frequency characteristic, it has a large tendency of variation per hour in the equivalent series resistance when the temperature is high. As a result, to suppress the above-mentioned temperature rise ΔT is important to a long life of the capacitor and the high reliability. The solid electrolytic capacitor according to a third embodiment of this invention has structure having a large effect in suppressing of such temperature rise.

Figure 7:
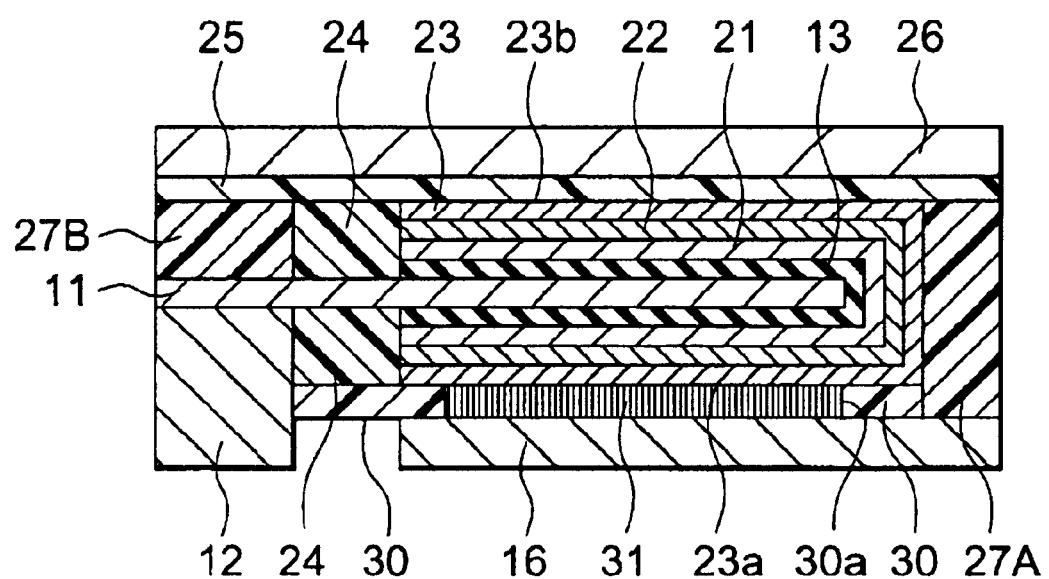
FIG. 7 is a longitudinal sectional view of an aluminum solid electrolytic capacitor according to a fourth embodiment of this invention.

Referring to FIG. 7, the description will proceed to an aluminum solid electrolytic capacitor according to a fourth embodiment of this invention. FIG. 7 is a longitudinal sectional view of the aluminum solid electrolytic capacitor. The illustrated solid electrolytic capacitor is similar in structure to the solid electrolytic capacitor illustrated in FIGS. 3A and 3B except that the solid electrolytic capacitor comprises a combination of a prepreg 30 and a silver paste 31 in lieu of the silver paste 18.

In the solid electrolytic capacitor, the prepreg 30 is pasted to a surface of the capacitor element at the external cathode terminal 16 side. The external cathode terminal 16 is pasted to the capacitor element through the prepreg 30. Inasmuch as the prepreg 30 is laid between the external cathode terminal 16 and the capacitor element, it is possible to improvement the sealing more.

The prepreg 30 has an opening 30a through the front and the back in the similar manner which is illustrated in FIG. 6B. In the opening 30a, the silver paste 31 serving as the conductive adhesive agent is filled. The external cathode terminal 16 is electrically connected to the cathode electrode of the capacitor element through the silver paste 31. With this structure, a space between the reinforcement plate 26 and the external cathode terminal 16 at sides of the capacitor element is supplied with a sufficient amount of the eluted epoxy resin from the prepregs 25 and 30 laid up and down. At the same time, the prepreg 30 is pasted on the epoxy resin body 24 acting as the masking material which laid between the capacitance manifestation region and a connecting region of the external anode terminal 12. By two effects, the sealing is more improvement. Although only the prepreg 30 has the opening 30a in which the silver paste 31 is filled in this embodiment, the prepreg 25 may have an opening in which a silver paste is filled in the similar manner which is illustrated in FIG. 6A.

Figure 8:
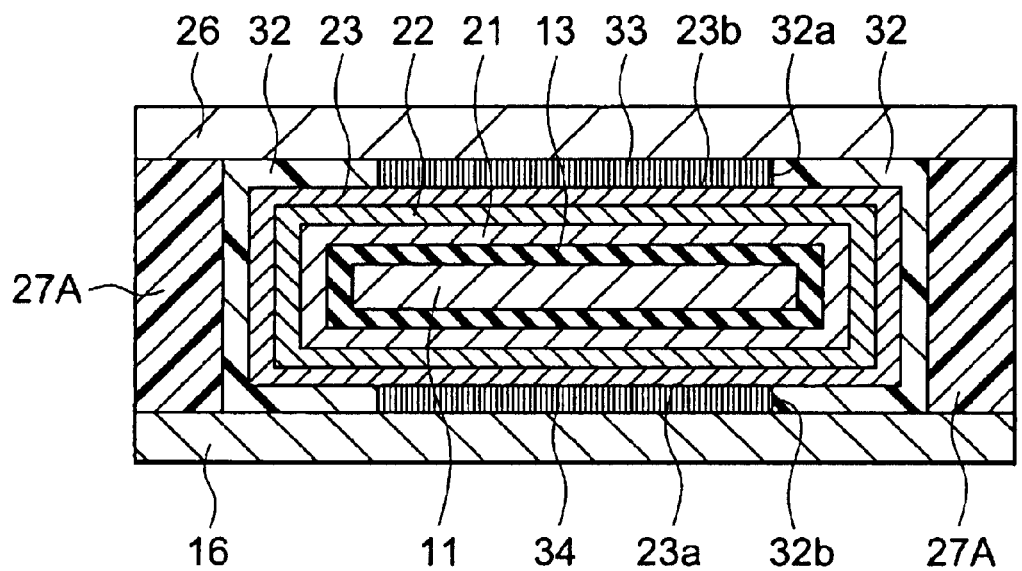
FIG. 8 is a transverse sectional view of an aluminum solid electrolytic capacitor according to a fifth embodiment of this invention.

Referring to FIG. 8, the description will proceed to an aluminum solid electrolytic capacitor according to a fifth embodiment of this invention. FIG. 8 is a transverse sectional view of the aluminum solid electrolytic capacitor. The illustrated solid electrolytic capacitor is similar in structure to the solid electrolytic capacitor illustrated in FIGS. 3A and 3B except that a cylindrical prepreg 32 surrounds the capacitor element at four circumferential surfaces thereof.

The cylindrical prepreg 32 has first and second openings 32a and 32b at sides of the reinforcement plate 26 and the external cathode terminal 16. Silver paste 33 is filled in the first opening 32a to electrically connect the reinforcement plate 26 with the silver paste layer 23. Silver paste 34 is filled in the second opening 32b to electrically connect the external cathode terminal 16 with the silver paste layer 23.

Figure 9:
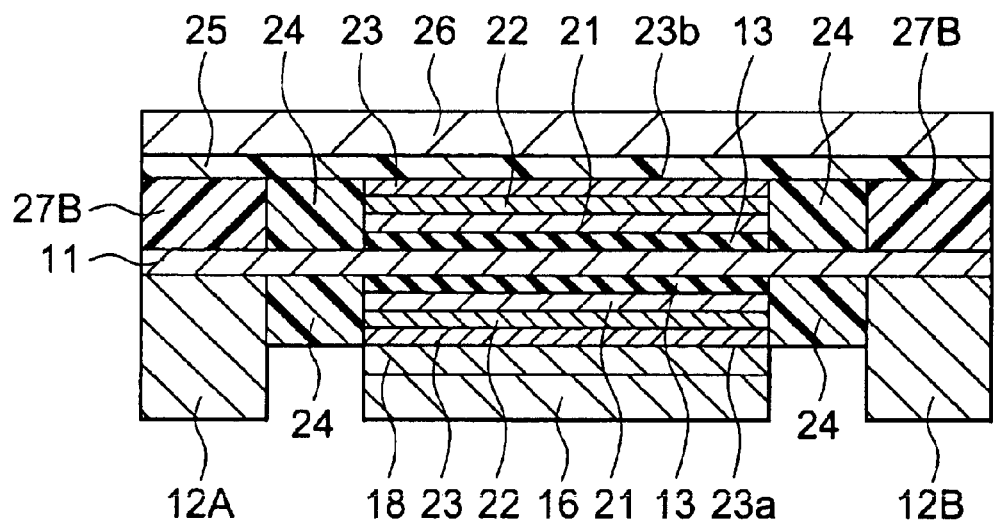
FIG. 9 is a longitudinal sectional view of an aluminum solid electrolytic capacitor according to a sixth embodiment of this invention.

Referring to FIG. 9, the description will proceed to an aluminum solid electrolytic capacitor according to a sixth embodiment of this invention. FIG. 9 is a longitudinal sectional view of the aluminum solid electrolytic capacitor. The illustrated solid electrolytic capacitor is similar in structure to the solid electrolytic capacitor illustrated in FIGS. 3A and 3B except that the solid electrolytic capacitor comprises first and second external anode sub-terminals 12A and 12B.

Specifically, the illustrated aluminum solid electrolytic capacitor has a capacitor manifestation region (a forming region of the aluminum oxide film 13, the poly-pyrrole layer 21, the graphite layer 22, and the silver paste layer 23) at a central portion of the aluminum foil 11 and first and second external anode terminal mounting sub-regions at right and left sides of the aluminum foil 11. The first and the second external anode sub-terminals 12A and 12B are disposed in the first and the second external anode terminal mounting sub-regions. Between the capacitor manifestation region and the first and the second external anode terminal mounting sub-regions, masking epoxy resin bodies 24 are disposed in order to insulate the anode electrode from the cathode electrode.

The illustrated solid electrolytic capacitor has a transmission path structure, which is called the so-called strip line, where a flat metal plate (the aluminum foil 11) is put between opposite metal plates (the external cathode terminal 16) through a dielectric (the aluminum oxide film 13). Specifically, when the solid electrolytic capacitor is mounted on a mounting substrate such as a printed wiring board with electronic circuit parts such as an LSI and when the second external anode sub-terminal 12B is connected to a wire of a DC power supply of the mounting substrate, the first external anode sub-terminal 12A is connected to a power supply terminal of the LSI, and the external cathode terminal is connected to a ground wire of the mounting substrate, the solid electrolytic capacitor serves as a distributed noise filter which effectively remove electric noises extending a wide frequency region compared with a case where a two-terminal capacitor is merely used as a decoupling element of a power supply. If the solid electrolytic capacitor is modified so as to connect the capacitor element with the reinforcement plate 26 by the silver paste by applying a structure of the prepreg illustrated in FIGS. 6A and 6B, it is possible to effectively remove electric noises caused by a shield effect.

While this invention has thus far been described in conjunction with several preferred embodiments thereof, it is to be understood that modifications will be apparent to those skilled in the art without departing from the sprit of the invention. For example, although the copper plate is used as the reinforcement plate 26 of the capacitor element in the above-mentioned embodiments, other materials except for metal may be used if the other materials have high stiffness which do not deform or bend by external force. A glass plate, a ceramic plate, or a plastic plate having a thickness similar to that of the reinforcement plate 26 used in the embodiments have a strength so as to sufficiently stand practical use. Inasmuch as the metal has a good conductivity and a good heat-dissipating, to use the conductive plate such as the metal plate as the reinforcement plate 26 is effective when it is desired to improve heat-dissipating by adopting structure illustrated in FIGS. 6A and 6B or when it is desired to enhance a noise filter effect of a transmission path structure by adopting structure illustrated in FIG. 9.

In addition, although any of the above-mentioned embodiments discloses an example where a valve-action metal of an anode electrode is aluminum and uses an etched aluminum foil having an enlarged surface by etching, this invention is not restricted to this. For example, this invention may use other valve-action metals such as tantalum, niobium, or the like. A method of enlarging a surface may be a method of depositing a powdered layer of the valve-action metal on a thin plate of the valve-action metal and of sintering the powdered layer into a layered sintered body in the manner which is disclosed, for example, in Japanese Unexamined Patent Publication Tokkai No. Sho 59-219,923 or JP-A 59-219923. Furthermore, the valve action-metal acting as the anode electrode may have a form of a sheet, of high stiffness, or soft such as the foil.

Furthermore, the prepreg may replace double-sided thermal adhesive material obtained by impregnating a film material with thermosetting resin.

What is claimed is:

1. A solid electrolytic capacitor comprising:
   a flat solid electrolytic capacitor element having first and second surfaces opposite to each other;
   an external anode terminal, disposed on the first surface of said flat solid electrolytic capacitor, for electrically connecting to the exterior;

an external cathode terminal, disposed on the first surface of said flat solid electrolytic capacitor apart from said external anode terminal, for electrically connecting the exterior;

a double-sided thermal adhesive film impregnated with thermosetting resin put on the second surface of said flat solid electrolytic capacitor; and a reinforcement plate fastened on said double-sided thermal adhesive film impregnated with thermosetting resin, said flat solid electrolytic capacitor being sandwiched between said external anode terminal, said external cathode terminal and said double-sided thermal adhesive film impregnated with thermosetting resin and said reinforcement plate, wherein said flat solid electrolytic capacitor has side faces sealed with an eluted material of thermosetting resin impregnated in said double-sided thermal adhesive film impregnated with thermosetting resin.

2. A solid electrolytic capacitor as claimed in claim 1, wherein said reinforcement plate is made of metal.

3. A solid electrolytic capacitor as claimed in claim 1, wherein said flat solid electrolytic capacitor has a capacitance manifestation region, said external cathode terminal has a configuration of a plate which has a size so as to project from the capacitance manifestation region of said flat solid electrolytic capacitor, said double-sided thermal adhesive film impregnated with thermosetting resin having a size so as to project from said flat solid electrolytic capacitor element, said eluted material fills a space between projected portions of said external cathode terminal and said double-sided thermal adhesive film impregnated with thermosetting resin from said flat solid electrolytic capacitor.

4. A solid electrolytic capacitor as claimed in claim 1, is a surface mounted type, said external anode terminal and said external cathode terminal are disposed with a space left therebetween to electrically connect to the exterior so as to have a surface along a horizontal direction, said flat solid electrolytic capacitor element comprising:

an anode electrode consisting of a thin plate made of a valve-action metal, said anode electrode having a capacitance manifestation region and an external anode terminal mounting region which are arranged with a space left therebetween;

an oxide film of a base material valve-action metal formed on the capacitance manifestation region of said anode electrode;

a layered cathode electrode adhered to said oxide film to cover said oxide film, said layered cathode electrode including a solid electrolyte layer; and an insulator disposed on an area between the external anode terminal mounting region of said anode electrode and the capacitance manifestation region of said anode electrode, said external anode terminal being conductively adhered to the external anode terminal mounting region of said anode electrode, said external cathode terminal being conductively connected to said cathode electrode at a side of the external anode terminal mounting region in said flat solid electrolytic capacitor element, said external cathode terminal having a size so as to project from said cathode electrode, said double-sided thermal adhesive film impregnated with thermosetting resin having a size so as to project from said flat solid electrolytic capacitor element; and said eluted material fills a space between said double-sided thermal adhesive film impregnated with thermosetting resin and a surface of said anode electrode opposite to a surface mounting said external anode terminal.

5. A solid electrolytic capacitor as claimed in claim 4, wherein said eluted material further fills another space between said double-sided thermal adhesive film impregnated with thermosetting resin and a projecting portion of said external cathode terminal from said cathode electrode.

6. A solid electrolytic capacitor as claimed in claim 1, wherein said solid electrolyte layer is made of a conductive macromolecule.

7. A solid electrolytic capacitor as claimed in claim 1, wherein said anode electrode comprises an etched aluminum foil having an enlarged surface by etching.

8. A solid electrolytic capacitor as claimed in claim 1, wherein said double-sided thermal adhesive film impregnated with thermosetting resin has an opening through the front and the back thereof, said opening being filled with a conductor made of a paste material including powder of high conductive metal so as to be in contact with said flat solid electrolytic capacitor element and said reinforcement plate.

9. A solid electrolytic capacitor as claimed in claim 4, wherein said external anode terminal mounting region is divided into first and second external anode terminal mounting sub-regions which put said capacitance manifestation region therebetween, said external anode terminal comprising first and second external anode sub-terminals which are electrically adhered to said first and said second external anode terminal mounting sub-regions, respectively, whereby said solid electrolytic capacitor has a three-terminal transmission path structure.

10. A solid electrolytic capacitor as claimed in claim 4, wherein further comprising an additional double-sided thermal adhesive film impregnated with thermosetting resin put on said insulator at a side of mounting of said external anode terminal and said external cathode terminal.

11. A solid electrolytic capacitor as claimed in claim 1, wherein said external anode terminal is plate-shaped.

12. A solid electrolytic capacitor as claimed in claim 1, wherein said external cathode terminal is plate-shaped.

13. A solid electrolytic capacitor as claimed in claim 4, wherein further comprises a second double-sided thermal adhesive film impregnated with thermosetting resin put on the first surface of said flat solid electrolytic capacitor, said second double-sided thermal adhesive film impregnated with thermosetting resin having a size so as to project from said flat solid electrolytic capacitor element, said external cathode terminal being adhered to said second double-sided thermal adhesive film impregnated with thermosetting resin, said second double-sided thermal adhesive film impregnated with thermosetting resin has an opening through the front and the back thereof, said opening being filled with a conductor made of a paste material including powder of high conductive metal so as to be in contact with the cathode electrode of said flat solid electrolytic capacitor element and said external cathode terminal, said eluted material fills another space between said double-sided thermal adhesive film impregnated with thermosetting resin and said second double-sided thermal adhesive film impregnated with thermosetting resin.

14. A solid electrolytic capacitor as claimed in claim 4, wherein said double-sided thermal adhesive is formed to be cylindrical so as to enclose said flat solid electrolytic capacitor.

15. A solid electrolytic capacitor as claimed in claim 4, wherein said external cathode terminal is adhered to said cathode electrode.

* * * * *